United States Patent
Masfaraud et al.

(10) Patent No.: US 8,092,338 B2
(45) Date of Patent: Jan. 10, 2012

(54) METHOD FOR RECOVERING ELECTRICAL ENERGY IN VEHICLE WITH REGENERATIVE BRAKING

(75) Inventors: Julien Masfaraud, Paris (FR); Hugues Doffin, Chatenay Malabry (FR)

(73) Assignee: Valeo Equipements Electriques Moteur, Creteil (FR)

( * ) Notice: Subject to any disclaimer, the term of this patent is extended or adjusted under 35 U.S.C. 154(b) by 497 days.

(21) Appl. No.: 12/303,781

(22) PCT Filed: Jun. 4, 2007

(86) PCT No.: PCT/FR2007/051373
§ 371 (c)(1),
(2), (4) Date: Dec. 8, 2008

(87) PCT Pub. No.: WO2008/000982
PCT Pub. Date: Jan. 3, 2008

(65) Prior Publication Data
US 2010/0234170 A1    Sep. 16, 2010

(30) Foreign Application Priority Data
Jun. 27, 2006   (FR) .................................. 06 52675

(51) Int. Cl.
*B60W 10/08* (2006.01)
(52) U.S. Cl. ................................................ 477/4; 477/9

(58) Field of Classification Search ............... 180/65.25, 180/65.285, 307, 65.6, 65.8, 65.265; 477/110, 477/115, 4, 9, 21; 60/702, 608, 711, 719
See application file for complete search history.

(56) References Cited

U.S. PATENT DOCUMENTS

| | | | | |
|---|---|---|---|---|
| 5,861,724 | A | * | 1/1999 | Ackerson ...................... 318/376 |
| 5,887,674 | A | * | 3/1999 | Gray, Jr. ........................ 180/307 |
| 5,906,098 | A | * | 5/1999 | Woollenweber et al. ....... 60/608 |
| 6,840,045 | B2 | * | 1/2005 | Kusase ............................ 60/702 |
| 7,398,844 | B2 | * | 7/2008 | Ishikawa et al. .......... 180/65.285 |
| 7,537,070 | B2 | * | 5/2009 | Maslov et al. ............. 180/65.25 |
| 7,905,813 | B2 | * | 3/2011 | Edelson et al. ............... 477/110 |
| 2003/0052650 | A1 | | 3/2003 | Gunji |
| 2009/0242288 | A1 | * | 10/2009 | Oyobe et al. ............. 180/65.265 |

FOREIGN PATENT DOCUMENTS

| | | |
|---|---|---|
| EP | 0 868 005 | 9/1998 |
| EP | 1 316 464 | 6/2003 |
| WO | WO 97/24793 | 7/1997 |

* cited by examiner

*Primary Examiner* — Hau Phan
(74) *Attorney, Agent, or Firm* — Berenato & White, LLC

(57) ABSTRACT

Method for recovering electrical energy in a vehicle with regenerative braking is used in a vehicle equipped for this purpose with an electrical capacitance device to store electrical energy supplied by a rotary electrical machine of the vehicle during regenerative braking operation. A choice is made, on the basis of the initial rotational speed of the rotary electrical machine to apply an energy recovery stratagem from at least the following two: —a first energy recovery strategy that favors high power supplied by the rotary electrical machine; and—a second energy recovery strategy that favors high efficiency of the rotary electrical machine.

9 Claims, 3 Drawing Sheets

FIG.3
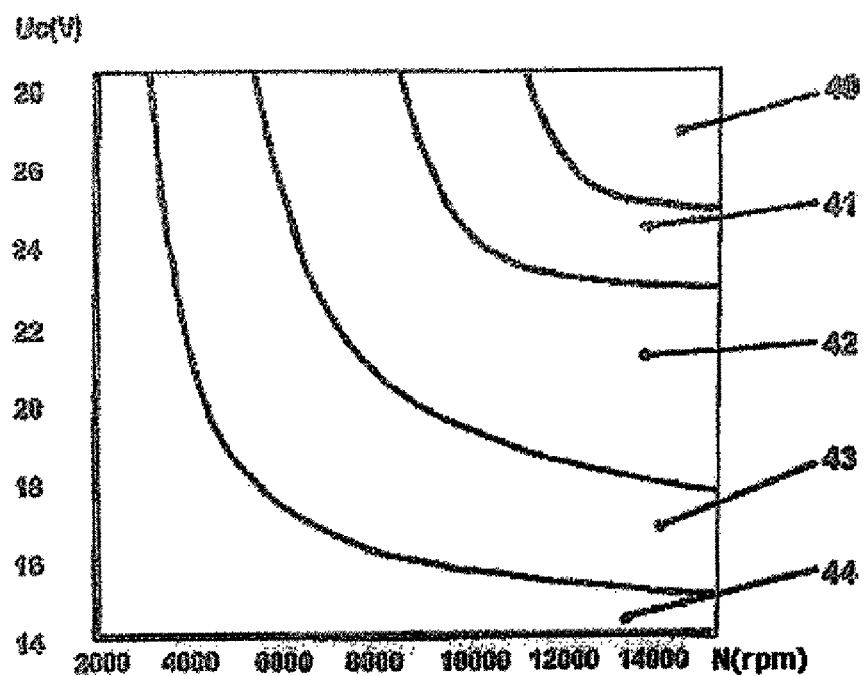
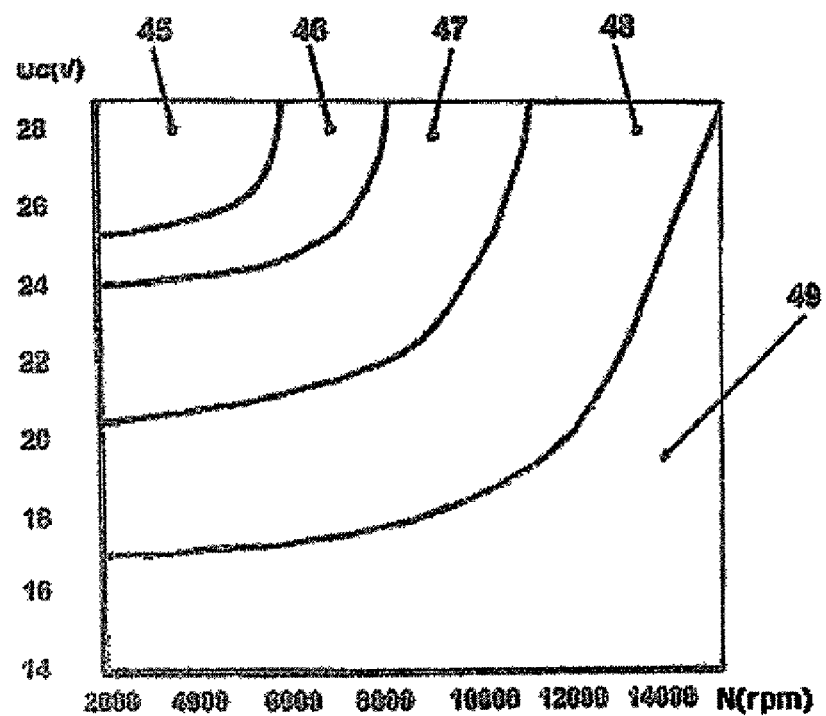
FIG.4

METHOD FOR RECOVERING ELECTRICAL ENERGY IN VEHICLE WITH REGENERATIVE BRAKING

CROSS-REFERENCE TO RELATED APPLICATIONS

This application relates to International Application No. PCT/FR2007/051373 filed Jun. 4, 2007 and French Patent Application No. 0652675 filed Jun. 27, 2006, of which the disclosures are incorporated herein by reference and to which priority is claimed.

The present invention is applied particularly to advantage in the motor vehicle sector. It relates in particular to a process for the recovery of electrical energy in a motor vehicle equipped with a regenerative braking system.

BACKGROUND OF THE INVENTION

1. Field of the Invention.

When a motor vehicle is braked, kinetic energy is dissipated into the brake disks in the form of heat. In order to recover this kinetic energy, the current state of the art provides for regenerative braking systems. Devices of this type are able to recover the kinetic energy given off during braking and to convert this into electrical energy.

2. Description of Related Art.

In a motor vehicle, the regenerative braking device is connected to an electrical distribution circuit of the vehicle, which comprises a battery in which this electrical energy can be stored. This battery is usually a conventional lead/acid battery. The electrical distribution circuit returns the energy that is stored in the battery to the different electrical and electronic components in the motor vehicle.

In a general manner, the requirements that a motor vehicle has for electrical energy increase as the number of such items of electrical and electronic equipment increase. There are two possible ways of meeting the growing need of motor vehicles, firstly by increasing the power of the alternators and the storage capacity of the battery or secondly by improving the energy performance of the electrical supply system.

The regeneration of electrical energy by regenerative braking contributes to an increase in the mean output of the electrical supply system and increases the amount of energy available at the same nominal installed power.

Increasing the power of the alternators and the storage capacity of the battery involves a number of drawbacks in terms of costs, space, a problem of installation in a difficult location (under the bonnet) and also of weight.

Furthermore, the lead/acid batteries normally used in motor vehicles are not suitable for loading with very high current levels during a sufficient period to allow part of the energy given off by a braking device to be recovered. In this type of device, the management of the transitory energy given off by regenerative braking is not efficient enough to ensure that the voltage circulating in the electrical distribution circuit is properly regulated and the repeated charging of the lead/acid battery has an effect of prematurely ageing the latter.

Another system consists in equipping the electrical supply system of the vehicle with a second electrical distribution circuit having a different secondary storage system to that of the main battery or storage system. The second electrical distribution circuit sits alongside the first circuit with the principal storage system. The second circuit with the secondary storage system delivers a floating DC supply voltage and the first circuit with the main storage system delivers a low DC voltage supply, generally lower than that of the said floating voltage. In this way, a general two-layer electrical energy distribution is obtained.

The two storage systems are interconnected by means of a DC/DC reversible voltage converter. The function of the converter is to enable energy to be transferred between the two storage systems and the distribution circuits. An electrical current generator, comprising an alternator or a starter alternator coupled to the heat engine of the vehicle, directly supplies the both secondary storage system with electrical energy and, through the converter, the main storage system.

The practice of employing a pack of very high capacity condensers as a storage system is already known. These very high capacity condensers are usually known as "super-capacitors" or "super-condensers" to the expert in the sector. The secondary storage system, which is also referred to "the super-capacitor" in the following description, has the function of recovering as much electrical energy as possible when the electrical current generator operates in the form of regenerative braking.

In comparison with a conventional lead/acid battery, the super-capacitor can operate regardless of the number of charging/discharging cycles and the depth of these is not affected by the voltage level of the charge, which can vary significantly.

To select the range of regeneration voltage of the super-capacitor used in a motor vehicle, the limits of the starting voltage must be satisfied, as it is the starting phase that requires the greatest electrical output so as to guarantee a sufficiently high energy level for the starter-alternator operating in the starter mode to start the heat engine. When the driver starts the engine, the super-capacitor discharges and unless the braking system is operated to any great degree, the amount of electrical energy that is recovered is insufficient to fully charge the super-capacitor. If the vehicle stops and the driver attempts to restart it, the quality of the restart is lower with the super-capacitor than with the heat engine.

The solution known previously requires an interval so that energy can be regenerated in the super-capacitor at a level generally of between 18 and 24 V so that the associated upper limits associated with the starting of the heat engine can be satisfied.

BRIEF SUMMARY OF THE INVENTION

The aim of the present invention is to provide a process for the regeneration of electrical energy for a new type of motor vehicle which enables the mean output level of the electrical supply system of the vehicle to be improved.

The process for the regeneration of electrical energy according to the present invention by regenerative braking in a motor vehicle is implemented in a vehicle that is equipped for this purpose with an electrical capacitance device that can store electrical energy supplied by a rotary electrical machine in the vehicle when the regenerative braking operation is carried out.

Accordingly, in accordance with the present invention, on the basis of the initial speed of rotation of the said rotary electrical machine, the solution chosen is to apply an energy regeneration strategy using at least the two following means:
- an initial energy regeneration stage, preferring a high level of power from the said rotary electrical al machine, and
- a second energy regeneration system, preferring a high performance from the said rotary electrical machine.

The process described briefly above thus provides for at least two means of optimisation, namely the optimisation of the power level on the one hand and an optimisation of the performance on the other. During the energy regeneration stage, it is considered that the front face of the engine of the vehicle does not limit the mechanical power that can be absorbed by the electrical machine. From this perspective, the optimisation is best obtained by attempting to maximise the mechanical power that is absorbed, and thereby the electrical energy that is regenerated during braking. For this reason, a strategy that aims to increase the electrical power regenerated by the electrical machine is preferred.

On the other hand, if the front face of the engine of the vehicle constitutes a limitation of the mechanical power absorbed by the heat engine, it would be necessary for the performance of the electrical machine to be improved. At the mechanical iso-power level in question, the electrical power regenerated from the electrical machine is at its greatest. For this reason, a strategy that aims to increase the performance will be preferred.

According to another particular feature, the first strategy of energy regeneration is chosen when the initial speed of rotation of the rotary electrical machine exceeds an initial threshold value, fixed at least as 10,000 rpm. Alternatively, the initial threshold value is fixed at a level equal at least to 12,000 rpm.

According to another particular feature of the invention, the second regeneration strategy is chosen when the initial speed of rotation of the rotary electrical machine is less than a second threshold value, fixed at a maximum of 8,000 rpm. Alternatively, the second threshold is fixed at a maximum of 6,000 rpm.

The process according to the present invention can also have at least one of the following features:
- the regenerative braking system is activated at the start of the braking process in cases where the braking process is short and at a high initial speed;
- the regenerative braking system is activated at the end of the braking process, where this process is long;
- the regenerative braking system is activated in a transitory manner when the vehicle is driven by a heat engine in the vehicle, in such a way as to displace a torque/speed functioning point of the said heat engine.

The invention also relates to an energy regeneration installation in a vehicle, with the said installation having automatic means of controlling regenerative braking and allowing the operation of the process in accordance with the brief description of the invention above.

The invention can be used to particular advantage in combination with the bi-voltage system known as 14+X. This architecture comprises two independent electrical circuits, one of which, the 14+X, by virtue of its technology, is capable of functioning at a variable voltage. This enables new control strategies to be employed in a particularly effective manner in order to maximise the performance or the electrical power that is supplied during the regeneration stage.

BRIEF DESCRIPTION OF THE SEVERAL VIEWS OF THE DRAWINGS

Other features and advantages of the invention will become apparent during a reading of the following description, for a better understanding of which reference is made to the attached drawings, in which:

FIG. 3 is a graph illustrating the different levels of electrical power during the stages of regenerative braking of the vehicle;

FIG. 4 is a graph illustrating the different levels of electrical performance during the stages of regenerative braking of the vehicle.

DETAILED DESCRIPTION OF THE INVENTION

Figure 1:
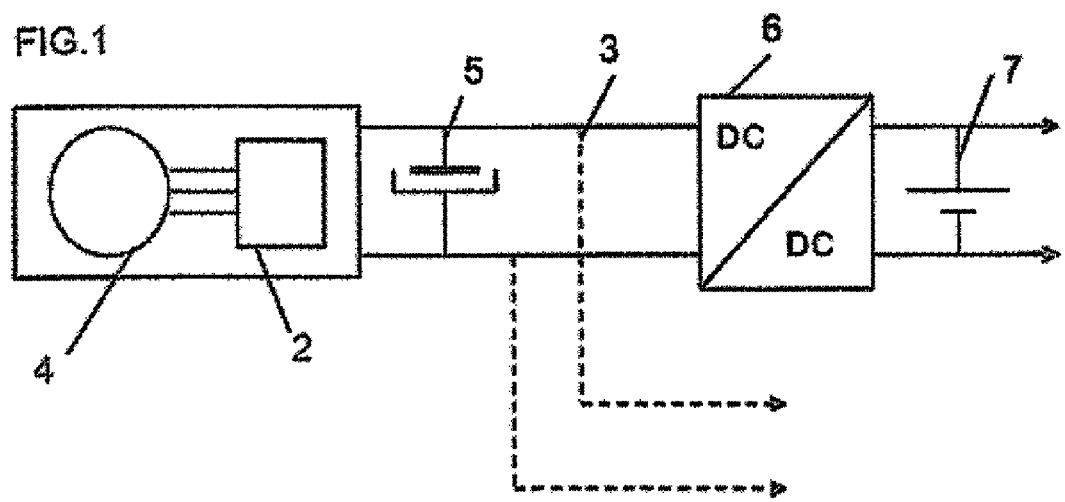
FIG. 1 shows schematically an illustration of the means of implementing an embodiment of the invention.

In a particular embodiment, FIG. 1 contains a schematic representation of an electrical energy regeneration system installed in a motor vehicle. An AC/DC converter 2 is connected firstly to a continuous bus 3 and secondly to a rotary electrical machine 4. The AC/DC converter 2 and the machine 4 are of the multi-phase type, typically of the three-phase type. The AC/DC converter 2 here is an electrical device of a voltage rectifier type enabling the three-phase AC voltages supplied by the machine 4, operating in an AC mode, to be converted into direct current. In other embodiments of the invention in which the machine 4 is reversible and functions as a starter-alternator, the AC/DC converter 2 is also reversible and comprises a wave mode to supply the machine 4 with three-phase voltages, which, is in this case an electrical machine or a starter.

The bus 3 comprises a reservoir 5 of electrical energy. This reservoir is a super-capacitor in this particular embodiment. In this situation, the super-capacitor is dimensioned for frequent urban braking conditions and not for major braking operations carried out by the driver of the vehicle. The super-capacitor 5 is supplied by the machine 4 through the AC/DC converter 2.

The bus 3 comprises two circuits of consumer equipment. The first circuit supplies a fluctuating direct voltage designated as 14+X and is connected to the terminals of the super-capacitor. The consumer equipment connected to this first circuit includes preferably items that are able to operate under a fluctuating voltage (demisters, windscreen wipers etc.). A second circuit supplies a voltage in the region of 12 V, which is available at the terminals of a lead acid battery. The first and second circuits are connected by means of a reversible DC-CD converter 6, which permits the transfer of energy at adequate voltages and enables in particular the second circuit to be supplied and the battery 7 to be charged.

Within the framework of the present invention, the notion of the battery covers any device constituting a reservoir of rechargeable electrical energy, at the terminals of which a non-nil DC voltage is available, at least in a state of non-nil charge of the device.

The electrical or electronic equipment are in particular connection lines, branched in parallel to the super-capacitor 5 or electrical consumers branched in parallel to the battery 7. The electrical consumers in a motor vehicle can include, typically, headlights and indicators, a radio, an air conditioning system, windscreen wipers etc.

The machine 4 can therefore be a starter-alternator. The concept of a starter-alternator provides for a rotary electrical machine having a reversible AC/DC converter.

When the AC/DC converter is in an undulating mode, the rotating machine operates as an electrical machine, for example, to start the heat engine of the vehicle. The starter-alternator enables the engine to be started quickly and silently, as it operates entirely electronically.

When the AC/DC mode is in rectifier mode, AC voltage supplied by the rotating machine operating as an alternator is rectified to supply the electrical supply circuits of the vehicle.

The device according to the invention enables the performance of the energy regeneration and the power of the heat engine of the motor vehicle to be optimised by storing electrical energy in the super-capacitor during the functioning of the regenerative braking and by returning it to meet the needs of the vehicle.

Figure 2:
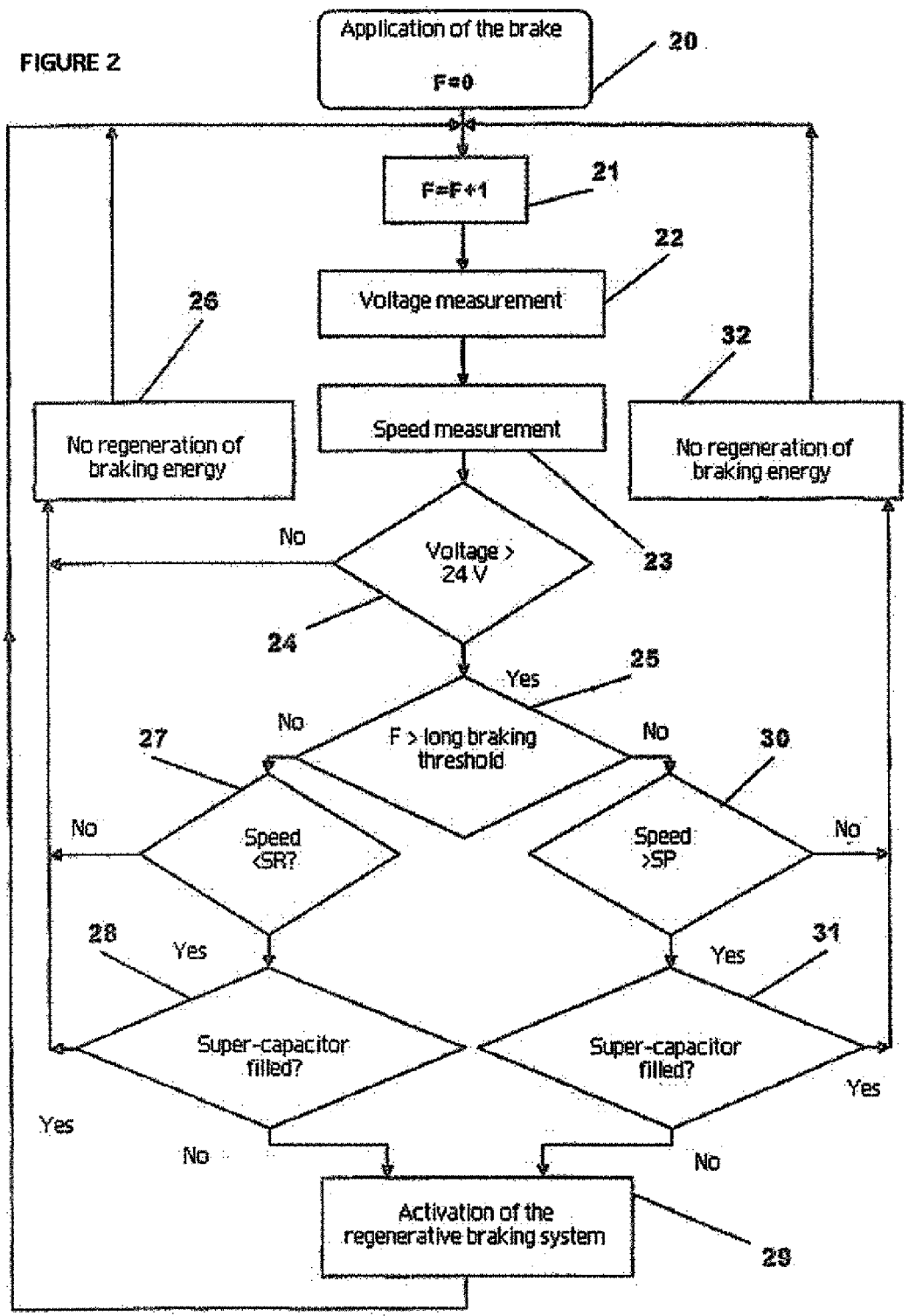
FIG. 2 illustrates the different stages of the operation of the device in accordance with the present invention.

FIG. 2 illustrates a particular embodiment described here in a non-limiting manner. FIG. 2 shows the operating stages employed by this particular embodiment at the level of a control logic, which is effected in a concrete manner with known equipment.

When the driver applies the brake of the vehicle, at stage 20, the index F, which is intended to indicate the length of a braking phase, is reset to zero. At stage 21, the control logic advances the index F by one unit. At stage 22, the control logic measures the voltage at the terminals of the super-capacitor. At stage 23 the control logic measures the speed of the electrical machine 4.

At stage 24, if the voltage measurement is greater than a value of, for example, 24 V, the control logic applies stage 25, otherwise it applies stage 26. At stage 25, the control logic verifies whether the index F is greater than a threshold value, indicating that the braking process is long. If the braking process is long, the control logic applies state 27. Otherwise it applies stage 30.

At stage 27, the control logic verifies whether the speed of the electrical machine 4 is below a threshold SR, which here is preferably equal to about 8,000 rpm. In this case, the control logic applies stage 28. Otherwise it applies stage 26. At stage 28, the control logic verifies whether the super-capacitor is completely full. In this case, the control logic applies stage 26. Otherwise it applies stage 29. At stage 26, the control logic does not activate the regenerative braking and the functioning reverts to Stage 21.

If the index F is lower than the long braking threshold value, this implies that the braking time is short. Stage 30 is then applied. The control logic determines whether the speed of the electrical machine 4 of the vehicle is greater than a threshold value SP, which in this case is preferably equal to about 10,000 rpm. In this case, the control logic applies stage 31 otherwise it applies stage 32. At stage 31, the control logic verifies whether the super-capacitor is completely full. If it is, it applies stage 32, if not it applies stage 29. At stage 32, the control logic does not activate regenerative braking and the system reverts to stage 21. At stage 29, the control logic activates regenerative braking so that the electrical energy supplied by the electrical machine 4 can be stored.

When the vehicle is moving, the driver may be required to respond to situations that arise from two different types of braking, namely short or intermediary braking on the one hand and long braking on the other. It is useful to bear in mind that, when the driver brakes, the energy regeneration device enables an optimum amount of available energy to be stored in the super-capacitor.

For example, in a short braking process, for example of 3 seconds, which will frequently happen in urban driving, the regenerative braking device will not have sufficient time to completely fill the super-capacitor, In this case, during the braking window, it will be interesting to use greater power for greater performance and thus to preferentially activate regeneration at the start of the braking stage. According to the invention, the energy regeneration takes place when the speed of the electrical machine 4 is above a high-speed threshold, which, in the application in question, is in the region of 10,000 rpm and where the voltage supplied by the motor is higher than 24 V. This is an optimisation of the functioning, which concerns the electrical power of the super-capacitor.

Otherwise, if the braking stage is sufficiently long in relation to a predetermined threshold, there will only be an energy regeneration if the speed of the electrical machine 4 is less than a low speed threshold, which, in the case in question, would be equal to 8,000 rpm. This is then an optimisation of the functioning, affecting the electrical performance of the super-capacitor.

FIG. 3 is a graph, which explains the features of the invention in conjunction with an optimisation of power. The graph lines represent the levels of electrical power during the phases of regenerative braking of the vehicle.

Six levels of power can be distinguished, which are determined by the voltage at the terminals of the super-capacitor in relation to the speed of rotation of the electrical machine 4. It can be clearly seen that, in order to maximise the regeneratable electrical power, which in the case chosen to illustrate the invention is in the region of 10 kW, it would be useful to define a regeneration window leading to a preferred regeneration of energy at high speed with a lower degree of liberty imposed by the vehicle, although it is also clear that it would be preferable to operate at higher voltages so as to achieve more efficient regenerative braking. For example, if braking occurred at a speed of 10,000 rpm then reaching 2,000 rpm, an optimised regeneration in power is favoured by starting the regeneration of energy at the highest point of speed and as it is not possible to foresee the end of the period during which the brake in applied, even though in general, depending on the surrounding topography, it is possible to know where the vehicle is going to come to a halt, it is preferable to let the regeneration take its course. The vehicle will only stop if the super-capacitor is completely full or if the driver stops braking.

Maximising the electrical power during an energy regeneration phase means charging the super-capacitors at a high voltage regardless of the operating speed. Nevertheless, at a very low speed, the voltage that maximises the electrical power is lower than 28 V, and more particularly in the region of 24 V. A more refined strategy could integrate a mean regenerative braking voltage on which would be centred the regeneration window. If there is a need to maximise the regenerated electrical power, it is preferable to initiate the regeneration stage at the start of the braking process. This would result in the operation taking place at the highest possible speed.

FIG. 4 is a graph presenting the different levels of electrical performance during the regenerative braking stages of the vehicle. Six performance levels can be distinguished, which are determined by the voltage at the terminals of the super-capacitor in relation to the speed of rotation of the electrical machine.

To maximise the regeneratable electrical performance, which in the present case, is considered to be in the region of 10 kW, it is necessary to define a regeneration window that preferably leads to high speed regeneration. A functioning at higher voltages allows more efficient regenerative braking. The high performance points correspond to high voltages and not low voltages. Functioning at high voltages ensures more efficient regeneration braking. The high performance points are at high voltage levels and not at low voltage levels, because of the losses that are produced at the level of the electrical machine and increase with the speed of the electrical machine, while the performance is reduced in relation to the speed. A maximisation of the performance goes hand in hand with operation at high voltage, because at the same heat losses, the regenerated electrical power is increased. In this way, in order to optimise functioning in performance, regenerative braking should be carried out at low speed.

If the electrical performance is maximised, it is preferable for operation to be carried out in the upper voltage ranges of the super-capacitors. In the course of a long braking where the initial speed is high, it could be beneficial if the regeneration were only activated at the end of the braking process at low and medium speeds.

Moreover, it will be noted here that the process according to the present invention—although described here in the context of a regenerative energy operation resulting from pressure on the vehicle brake pedal—can also apply in cases where a means of transitory regenerative braking is activated, for example, by the operator of the vehicle or the heat engine, during the operation of the vehicle by the heat engine, without any pressure on the brake pedal, in such a way as to displace the torque/heat engine speed by one operating step.

The invention claimed is:

1. A regenerative braking process for regeneration of electrical energy in a motor vehicle by a regenerative braking system thereof activated during a braking process, said vehicle being equipped with an electrical capacitance device for the storage of electrical energy supplied by a rotary electrical machine of said vehicle during a regenerative braking operation resulting from applying pressure on a brake pedal of said motor vehicle, said regenerative braking process comprising the step of choosing an energy regeneration strategy on the basis of an initial speed of rotation of said electrical machine, said energy regeneration strategy chosen from the following energy regeneration strategies:
   a first energy regeneration strategy favoring the use of a high level of power supplied by said rotary electrical machine (4), and
   a second energy regeneration strategy favoring the use of a high level of performance of said rotary electrical machine (4).

2. The regenerative braking process in accordance with claim 1, wherein said first energy regeneration strategy is chosen if said initial speed of rotation of said rotary electrical machine exceeds an initial threshold value, fixed at a level of at least 10,000 rpm.

3. The regenerative braking process in accordance with claim 2, wherein said initial threshold value is fixed at a speed at least equal to 12,000 rpm.

4. The regenerative braking process in accordance with claim 1, wherein said second energy regeneration strategy is chosen if said initial speed of rotation of said rotary electrical machine is less than a second threshold value, fixed, at the most, at 8000 rpm.

5. The regenerative braking process in accordance with claim 4, wherein said second threshold value is fixed at a level greater than 6,000 rpm.

6. The regenerative braking process in accordance with claim 1, wherein said regenerative braking process is activated at the start of said braking process when said braking process is short and at a high initial speed.

7. The regenerative braking process in accordance with claim 1, wherein the regenerative braking process is activated at the end of said braking process when said braking process is long.

8. The regenerative braking process in accordance with claim 1, wherein a transitory regenerative braking process is activated while said motor vehicle is being driven by a heat engine of said vehicle without any pressure on a break pedal in such a way as to displace the torque/engine speed of said heat engine by one step.

9. An energy recovery system in a vehicle comprising automatic means of control of the regenerative braking system by using a regenerative breaking process in accordance with claim 1.

* * * * *